United States Patent [19]

Bosmani

[11] Patent Number: 5,505,622

[45] Date of Patent: Apr. 9, 1996

[54] APPARATUS FOR GUIDING THE SAYING AND MEDITATION OF THE ROSARY

[76] Inventor: Stefano Bosmani, Via Delle Monachelle, 70-Pomezia, Rome, Italy

[21] Appl. No.: 257,695

[22] Filed: Jun. 6, 1994

[30] Foreign Application Priority Data

Jun. 10, 1993 [IT] Italy .................. RM930116 U

[51] Int. Cl.$^6$ ........................................ G09B 1/00
[52] U.S. Cl. ............................ 434/246; 434/245
[58] Field of Search ...................... 434/245, 246; 368/10; 364/419.01

[56] References Cited

U.S. PATENT DOCUMENTS

| | | | |
|---|---|---|---|
| 3,806,911 | 4/1974 | Pripusich | 345/198 |
| 4,365,246 | 12/1982 | Dewolf et al. | 434/246 X |
| 4,445,196 | 4/1984 | Gonet | 364/419.01 |
| 4,512,667 | 4/1985 | Doulton et al. | 368/10 |
| 4,601,584 | 7/1986 | Dewolf et al. | 368/10 |

*Primary Examiner*—Richard J. Apley
*Assistant Examiner*—Glenn E. Richman
*Attorney, Agent, or Firm*—Young & Thompson

[57] ABSTRACT

Apparatus, particularly portable for personal use, for guiding a believer in the saying and meditation of the rosary, having a display (7) for presenting the single steps of the prayer of the rosary one at a time and keys (5, 6) controllable by the believer for sequentially advancing the presentation of the single steps themselves.

11 Claims, 2 Drawing Sheets

APPARATUS FOR GUIDING THE SAYING AND MEDITATION OF THE ROSARY

BACKGROUND OF THE INVENTION

1. Field of the Invention

The present invention relates to an apparatus for guiding the believer to prayer.

More specifically, it relates to an apparatus for guiding the saying and meditation of the rosary.

2. Description of the Related Art

As is known, the rosary is a prayer in the honour of the Virgin Mary and consists in saying a hundred and fifty Hail Mary, divided in fifteen tens, intercalated with the saying of the Lord's Prayer and the Gloria. At each ten, one keeps meditating on one of the fifteen Mysteries of Redemption which consist in events of Gospel history and are divided in three series regarding Jesus' and Mary's Joy (Joyful Mysteries), Sorrow (Sorrowful Mysteries) and Gloria (Glorious Mysteries).

The Joyful Mysteries are the Annunciation, the Visitation, Jesus' birth, the Virgin's Purification, and Jesus's finding among the Scribes. The Sorrowful Mysteries are the Agony, the Flagellation, the Crowning with thorns, the Trip to the Calvary, the Crucifixion and death. The Glorious Mysteries are Jesus' Resurrection, the Ascension to Heaven, the descent of the Holy Ghost, Mary's Assumption, and her Crowning.

The essence and the merit of this prayer are in joining mental prayer and vocal prayer together.

As far back as antiquity and in the most disparate cultures, besides prayer books, means for assisting the believer in the prayer are known. For instance there are plates bearing series of images, each one associated with a different step of a prayer.

In the saying of the Rosary, due to its complexity relative to other prayers, a means was created and is still commonly used to the present day—particularly portable for the personal use in any place—for counting the Hail Mary and the Lord's Prayer, made up of a crown chain wherein groups of ten beads which serve for the Hail Mary, are fixed, each one intercalated with a large bead or major grain, which serves for the Lord's Prayer.

This crown is itself named a rosary for metonymy. It represents, with its grains, the third part of the rosary, the saying of three Hail Mary corresponding with each grain. The rosary in a reduced form can also be said limitedly to such a third part, it also is commonly named a rosary, in which case a single Hail Mary corresponds with each grain.

The crown rosary such as known heretofore, however, has the disadvantage of reminding the believer of the various steps of the prayer in an only vague manner.

OBJECTS AND SUMMARY OF THE INVENTION

The object of the present invention is to provide a means that guides the believer step-by-step in the vocal saying and in the meditation of the Rosary in a substantially more precise and suggestive way.

Another object of the present invention is to provide such a means, that is easy and convenient to be borne on oneself and to be utilized as a personal apparatus.

Such objects are reached with an apparatus that displays the various steps of the Rosary one at a time, endowed with a mechanism for sequentially advancing the stops themselves upon the believer's command.

For such an apparatus the construction with electronic hardware is particularly provided.

This construction has the double advantage of a low cost and of a versatility of the apparatus itself. Based upon the electronic hardware, the displaying of the various steps of the Rosary can be concretely carried out in both an optical manner on a video screen, and an acoustical manner through a voice synthesizer.

The visual displaying is in turn susecptible of various embodiments, both alfa-numerical and graphical.

For the apparatus the realization in the form of a box in pocket-size or anyhow portable is particularly envisaged, that offers the advantage that a believer is able with it to profitably employ, praying, a few minutes also of his free time in any place he finds itself.

The electronic minaturization allows in this connection executions to very reduced sizes.

Therefore, the present invention relates to an apparatus for guiding a believer in the saying of the rosary, comprising means for displaying the single steps of the prayer of the rosary one at a time and means controllable by the believer for sequentially advancing the displaying of the single steps themselves.

According to the preferred embodiment of the present invention, said displaying means are a device controlled by a microprocessor and said means for sequentially advancing are two keys interfaced with the microprocessor itself, and the apparatus includes means for storing the information to be displayed for each step.

Advantageously, the apparatus is endowed with means for storing the step displayed last.

Particularly, the realization as a video display is envisaged for said displaying device.

It is envisaged that such a video screen display is an alphanumerical video screen display.

It is, particularly, envisaged that such an alphanumerical display is a liquid crystal display.

It is however also envisaged that the video display is a graphical display.

It is still further envisaged that said video display is made up of a group of light emitting diodes for the ten Hail Mary and another three light emitting diodes for indicating the group of Mysteries.

The realization as a vocal synthesizer is however also envisaged for said displaying device.

The present invention also relates to an apparatus for guiding the believer in the saying of the rosary, comprising means for displaying the single steps of the prayer of the rosary step by step and means controllable by the believer for sequentially advancing the displaying of the single steps themselves, further comprising means for emitting musical motives accompanying the various steps of the rosary.

According to an embodiment thereof, said means for emitting musical motives are made up of a piezoelectric buzzer.

BRIEF DESCRIPTION OF DRAWINGS

The present invention will be best understood based upon the following detailed disclosure of preferred embodiment thereof, given only as a matter of a example, absolutely not of restriction, with reference to the annexed drawings, wherein.

DETAILED DESCRIPTION OF THE PREFERRED EMBODIMENTS

Figure 1:
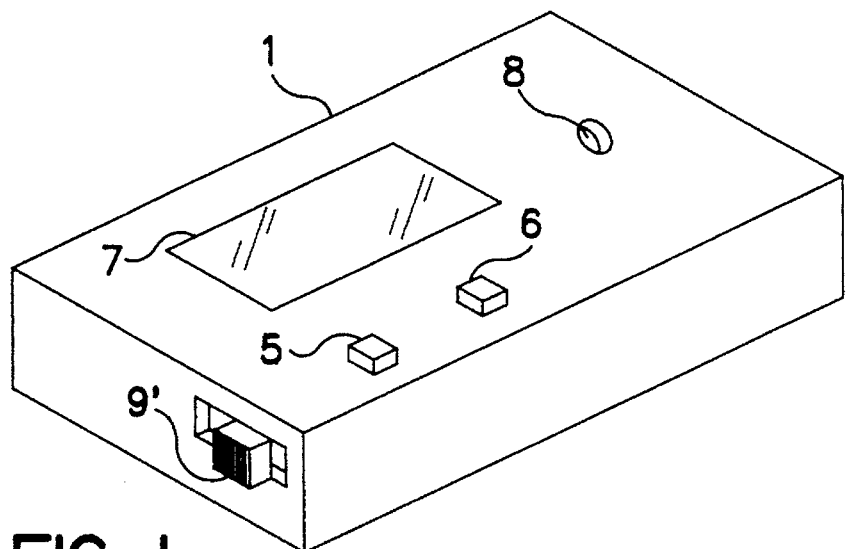
FIG. 1 represents a pictorial view of an embodiment of the apparatus of the present invention.

As can be seen in FIG. 1, the apparatus of the present invention shows itself as a pocket plastic box 1.

Figure 3:
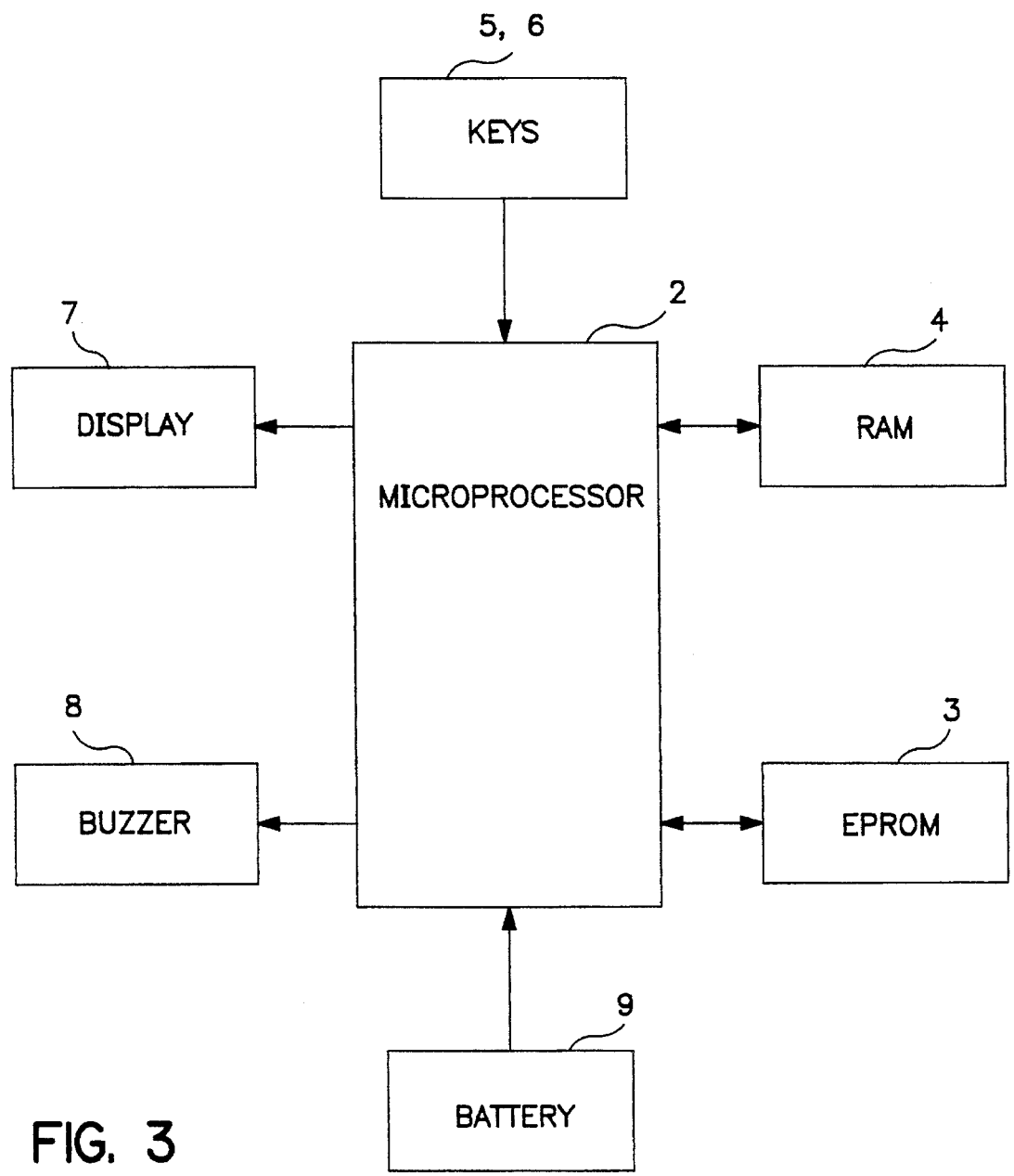
FIG. 3 represents the hardware architecture to make the apparatus of the present invention to perform its functions.

Such a plastic box contains the electronic hardware represented in FIG. 3. It comprises a 4-or 8-bit microprocessor 2, which addresses 8 kilobytes of an erasable programmable read only memory or EPROM 3 and some hundreds bytes of a random access memory or RAM 4.

Microprocessor 2 manages two keys 5 and 6, diversified with green and red colors, a liquid crystal alphanumerical video display 7 of two (2) rows by sixteen (16) characters and a piezoelectric buzzer 8.

The power supply of the apparatus is provided by storage batteries or accumulators 9, for a value of 6 volts with a consumption of about 50 milliamperes.

The hardware is endowed with means (not shown) for supplying the RAM 4 with the apparatus turned off too, so allowing the data in the memory to be preserved.

Based upon such a hardware, all the various steps of the rosary are shown alphanumerically on the video display 7 (visual displaying means) through the two keys 5 and 6 (means for advancing the displaying); the piezoelectric buzzer 8 omits short religious motives fit for stressing the most important passages among the various prayers to the believer.

After turning the apparatus on, one has the following operation sequence:

| ACTION | DISPLAY | MUSIC |
| --- | --- | --- |
| GREEN KEY | THE HOLY ROSARY JOYFUL MYSTERIES | MOTIVE OF JOYFUL MYSTERIES |
| GREEN KEY | MAKE THE SIGN OF THE CROSS | |
| GREEN KEY | 1 MARY RECEIVES THE ANNUNCIATION | |
| GREEN KEY | THE LORD'S PRAYER IS SAID | MOTIVE OF THE LORD'S PRAYER |
| GREEN KEY | 1 ANNUNCIATION HAIL MARY 1 | MOTIVE OF THE HAIL MARY (THE FIRST TIME ONLY) |
| ... | | |
| GREEN KEY | 1 ANNUNCIATION HAIL MARY 10 | A "CLICK" OF THE BUZZER FOR EACH FURTHER HAIL MARY |
| GREEN KEY | THE GLORIA TO THE LORD | MOTIVE OF THE GLORIA TO THE LORD |
| GREEN KEY | 2 MARY VISITS ELIZABETH | |
| GREEN KEY | THE LORD'S PRAYER IS SAID | MOTIVE OF THE LORD'S PRAYER |
| GREEN KEY | 2 VISITATION HAIL MARY 1 | MOTIVE OF THE HAIL MARY (THE FIRST TIME ONLY) |
| ... | | |
| GREEN KEY | 2 VISITATION | A "CLICK" OF THE BUZZER FOR EACH FURTHER HAIL MARY |
| GREEN KEY | THE GLORIA TO THE LORD | MOTIVE OF THE GLORIA TO THE LORD |
| GREEN KEY | 3 JESUS IS BORN IN BETHLEHEM | |
| GREEN KEY | THE LORD'S PRAYER IS SAID | MOTIVE OF THE GLORIA TO THE LORD |
| GREEN KEY | 3 THE BIRTH HAIL MARY 1 | MOTIVE OF THE GLORIA TO THE LORD HAIL MARY (THE FIRST TIME ONLY) |
| ... | | |
| GREEN KEY | 3 THE BIRTH HAIL MARY 10 | A "CLICK" OF BUZZER FOR EACH FURTHER HAIL MARY |
| GREEN KEY | THE GLORIA TO THE LORD IS SAID | MOTIVE OF THE GLORIA TO THE LORD |
| GREEN KEY | THE SALVE REGINA IS SAID | MOTIVE OF THE SALVE REGINA |
| GREEN KEY | THE LITANIES | |

-continued

| ACTION | DISPLAY | MUSIC |
|---|---|---|
| | ARE SAID | |
| GREEN KEY | THE HOLY ROSARY SORROWFUL MYSTERIES | MOTIVE OF THE SORROWFUL MYSTERIES |
| GREEN KEY | MAKE THE SIGN OF THE CROSS | |
| GREEN KEY | 1 JESUS SWEATS BLOOD IN THE GARDEN | |
| GREEN KEY | THE LORD'S PRAYER IS SAID | MOTIVE OF THE LORD'S PRAYER |
| GREEN KEY | 1 AGONY HAIL MARY 1 | MOTIVE OF THE HAIL MARY (THE FIRST TIME ONLY) |
| GREEN KEY | 1 AGONY HAIL MARY 10 | A "CLICK" OF THE BUZZER FOR EACH FURTHER HAIL MARY |
| GREEN KEY | THE GLORIA TO THE LORD | MOTIVE OF THE GLORIA TO THE LORD |
| GREEN KEY | 2 JESUS IS FLAGELLATED | |
| GREEN KEY | THE LORD'S PRAYER IS SAID | MOTIVE OF THE LORD'S PRAYER |
| GREEN KEY | 2 FLAGELLATION HAIL MARY 1 | MOTIVE OF THE HAIL MARY (THE FIRST TIME ONLY) |
| GREEN KEY | 2 FLAGELLATION HAIL MARY 10 | A "CLICK" OF THE BUZZER FOR EACH FURTHER HAIL MARY |
| GREEN KEY | THE GLORIA TO THE LORD IS SAID | MOTIVE OF THE GLORIA TO THE LORD |
| GREEN KEY | 3 JESUS CROWNED WITH THORNS | |
| GREEN KEY | THE LORD'S PRAYER IS SAID | MOTIVE OF THE LORD'S PRAYER |
| H + GREEN KEY | 3 THE THORNS HAIL MARY 1 | MOTIVE OF THE HAIL MARY (THE FIRST TIME ONLY) |
| GREEN KEY | 3 THE THORNS HAIL MARY 10 | A "CLICK" OF THE BUZZER FOR EACH FURTHER HAIL MARY |
| GREEN KEY | THE GLORIA TO THE LORD IS SAID | MOTIVE OF THE GLORIA TO THE LORD |
| GREEN KEY | 4 JESUS CARRIES THE CROSS | |
| GREEN KEY | THE LORD'S PRAYER IS SAID | MOTIVE OF THE LORD'S PRAYER |
| GREEN | 4 THE CROSS HAIL MARY 1 | MOTIVE OF THE HAIL MARY (THE FIRST TIME ONLY) |
| GREEN KEY | 4 THE CROSS HAIL MARY 10 | A "CLICK" OF THE BUZZER FOR EACH FURTHER HAIL MARY |
| GREEN KEY | THE GLORIA TO THE LORD IS SAID | MOTIVE OF THE GLORIA TO THE LORD |
| GREEN KEY | 5 JESUS DIES ON THE CROSS | |
| GREEN KEY | THE LORD'S PRAYER IS SAID | MOTIVE OF THE LORD'S PRAYER |
| GREEN KEY | 5 THE DEATH HAIL MARY 1 | MOTIVE OF THE HAIL MARY (THE FIRST TIME ONLY) |
| GREEN KEY | 5 THE DEATH HAIL MARY 10 | A "CLICK" OF THE BUZZER FOR EACH FURTHER HAIL MARY |
| GREEN KEY | THE GLORIA TO | MOTIVE OF THE |

-continued

| ACTION | DISPLAY | MUSIC |
|---|---|---|
| | THE LORD | GLORIA TO THE LORD |
| GREEN KEY | THE SALVE REGINA IS SAID | MOTIVE OF THE SALVE REGINA |
| GREEN KEY | THE LITANIES ARE SAID | |
| GREEN KEY | THE HOLY ROSARY GLORIOUS MYSTERIES | MOTIVE OF THE GLORIOUS MYSTERIES |
| GREEN KEY | MAKE THE SIGN OF THE CROSS | |
| GREEN KEY | 1 JESUS RESURRECTS FROM DEATH | |
| GREEN KEY | THE LORD'S PRAYER IS SAID | MOTIVE OF THE LORD'S PRAYER |
| GREEN KEY | 1 RESURRECTION HAIL MARY 1 | MOTIVE OF THE HAIL MARY (THE FIRST TIME ONLY) |
| | . . . | |
| GREEN KEY | 1 RESURRECTION HAIL MARY 10 | A "CLICK" OF THE BUZZER FOR EACH FURTHER HAIL MARY |
| GREEN KEY | THE GLORIA TO THE LORD IS SAID | MOTIVE OF THE GLORIA TO THE LORD |
| | . . . | |
| GREEN KEY | 2 JESUS ASCENDS TO HEAVEN | MOTIVE OF THE LORD'S PRAYER |
| GREEN KEY | 2 ASCENSION HAIL MARY 1 | MOTIVE OF THE (THE FIRST TIME ONLY) |
| | . . . | |
| GREEN KEY | 2 ASCENSION HAIL MARY 10 | A "CLICK" OF THE BUZZER FOR EACH FURTHER HAIL MARY |
| GREEN KEY | THE GLORIA TO THE LORD IS SAID | MOTIVE OF THE GLORIA TO THE THE LORD |
| GREEN KEY | 3 JESUS GIVES THE HOLY SPIRIT | |
| GREEN KEY | THE LORD'S PRAYER IS SAID | MOTIVE OF THE LORD'S PRAYER |
| GREEN KEY | 3 WHITSUNDAY HAIL MARY 10 | MOTIVE OF THE HAIL MARY (THE FIRST TIME ONLY) |
| | . . . | |
| GREEN KEY | 3 WHITSUNDAY HAIL MARY 1 | A "CLICK" OF THE BUZZER FOR EACH FURTHER HAIL MARY |
| GREEN KEY | THE GLORIA TO THE LORD IS SAID | MOTIVE OF THE GLORIA TO THE LORD |
| GREEN KEY | 4 BLESSED MARY RECEIVED INTO HEAVEN | |
| GREEN KEY | THE LORD'S PRAYER IS SAID | MOTIVE OF THE LORD'S PRAYER |
| GREEN KEY | 4 ASSUMPTION HAIL MARY 1 | MOTIVE OF THE HAIL MARY (THE FIRST TIME ONLY) |
| | . . . | |
| GREEN KEY | 4 ASSUMPTION HAIL MARY 10 | A "CLICK" OF THE BUZZER FOR EACH FURTHER HAIL MARY |
| GREEN KEY | THE GLORIA TO THE LORD IS SAID | MOTIVE OF THE GLORIA TO THE LORD |
| GREEN KEY | 5 MARY CROWNED THE QUEEN | |
| GREEN KEY | THE LORD'S PRAYER IS SAID | MOTIVE OF THE LORD'S PRAYER |
| GREEN KEY | 5 CROWNING HAIL MARY 1 | MOTIVE OF THE HAIL MARY (THE FIRST TIME ONLY) |
| | . . . | |
| GREEN KEY | 5 CROWNING HAIL MARY 10 | A "CLICK" OF THE BUZZER FOR EACH |

| ACTION | DISPLAY | MUSIC |
| --- | --- | --- |
| GREEN KEY | THR GLORIA TO THE LORD IS SAID | FURTHER HAIL MARY MOTIVE OF THE GLORIA TO THE LORD |
| GREEN KEY | THE SALVE REGINA IS SAID | MOTIVE OF THE SALVE REGINA |
| GREEN KEY | THE LITANIES ARE SAID | |

From this point, by keeping on pressing the green key, one can start again from the beginning.

On the contrary, by pressing the red key anywhere one finds himself in the rosary, one can select which group of mysteries to recite, in the following order:

| ACTION | DISPLAY | MUSIC |
| --- | --- | --- |
| RED | THE HOLY ROSARY JOYFUL MYSTERIES | MOTIVE OF THE JOYFUL MYSTERIES |
| RED | THE HOLY ROSARY SORROWFUL MYSTERIES | MOTIVE OF THE SORROWFUL MYSTERIES |
| RED | THE HOLY ROSARY GLORIOUS MYSTERIES | MOTIVE OF THE GLORIOUS MYSTERIES |

Turning the apparatus off and then having to interrupt the prayer, upon returning the apparatus on, the believer will not have to restart from the beginning or remember where he had arrived, but the display will reposition itself automatically in the interrupt point.

The displaying of the messages can be provided in any desired tongue.

According to a variant of such an embodiment, graphical messages are substituted for the alphanumerical messages, on a larger displaying array, which can offer a suggestive result advantage.

Variants are envisaged having the two display forms in combination.

Figure 2:
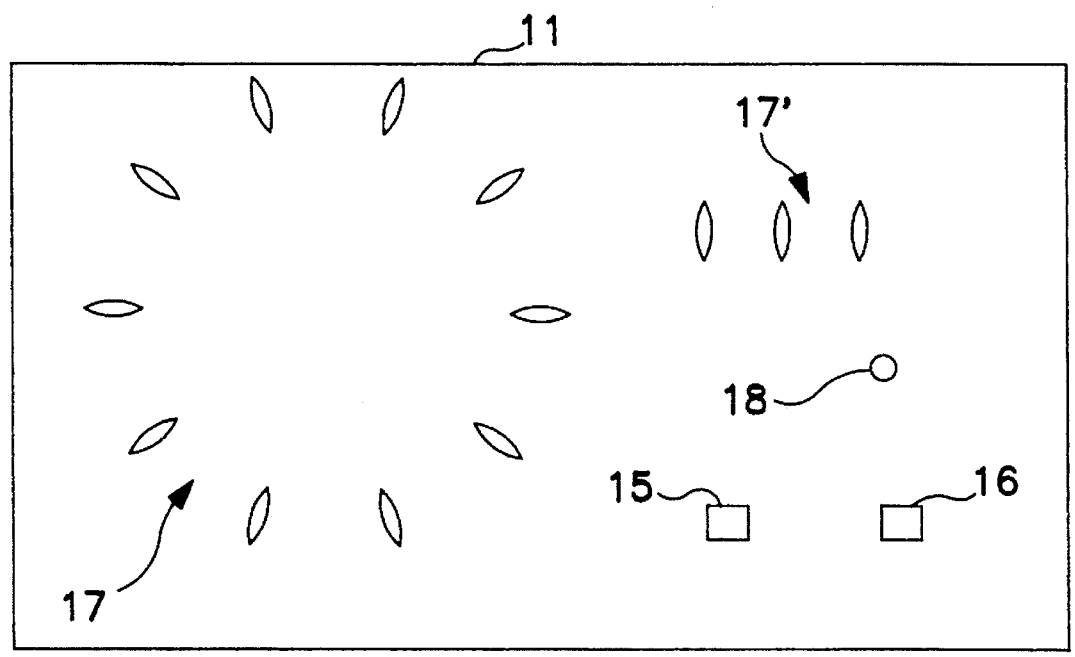
FIG. 2 represents a pictorial view of another embodiment of the apparatus of the present invention.

With reference to FIG. 2, another embodiment is disclosed of the apparatus of the present invention. Elements thereof corresponding with those of the embodiment of FIG. 1 are designated with the same numerals increased by ten. It presents itself equal to the apparatus of FIG. 1, with a small, pocket plastic box 11 and with the electronic hardware shown in FIG. 3, except that in the place of the alphanumerical displaying, there is disclosed a group of light emitting diodes or LED's 17 (visual display means) for the ten Hail Mary and other 3 LED's 17' (visual display means) for indicating the group of mysteries that one keeps meditating, keeping the musical motives unaltered.

In this case a Hail Mary or a Mystery is represented by the turning on of one of the relevant LED's.

The representation is less suggestive, but the execution variant is cheaper.

In this embodiment too, the advancement commands are imparted through two keys 15 and 16 (means for advancing the display), with the same execution modality.

According to another embodiment (not represented) in the place of the visual displaying, an acoustical presentation is provided, by endowing the hardware disclosed with reference to FIG. 3 with a vocal synthesizer that vocally recites the messages.

The eventual combination of the two presentations, the visual and the acoustical ones, with the microprocessor that controls both a video display and a vocal synthesizer, is also envisaged.

Summing up, a religious use apparatus has thus been realized, which especially for modern youth turns out to be in synchrony with today's technological development whereto the new generations are accustomed since childhood from.

The present invention has been disclosed with reference to preferred embodiments thereof, but it is to be expressedly understood that variations, additions and/or omissions can be made thereto, without so departing from its protective scope, as defined by the appended claims.

List of the Numerals

1: pocket plastic containing box;
2: microprocessor;
3: EPROM;
4: RAM;
5, 6: advancing keys;
7: display;
8: piezoelectric buzzer;
9: battery; 9': turning on switch;
11: pocket plastic containing box;
15, 16: advancing keys;
17: LED's group for the ten Hail Mary;
17': LED's group for the three Mysteries; and
18: piezoelectric buzzer

I claim:

1. A rosary guidance apparatus for guiding a believer in saying a rosary, comprising:

display means (7; 17, 17') for presenting single steps of a rosary prayer one at a time;

key means (5, 6; 15, 16), controllable by the believer, for advancing sequentially a presentation of the single steps of the rosary prayer;

buzzer means (8; 18) for emitting religious motives, during the sequential advancement of the rosary prayer, fit for stressing important passages of the rosary prayer; and microprocessor means (2) for controlling the display means (7; 17, 17') and the buzzer means (8; 18).

2. An apparatus according to claim 1, further comprising:

an erasable programmable read-only memory (3); and a random access memory (4); and said memories (3, 4) being operatively connected to the microprocessor means (2).

3. An apparatus according to claim 2, further comprising:

at least one battery means (9) for storing and providing power to the microprocessor means (2).

4. An apparatus according to claim 3, further comprising:

switch means (9') for turning power on and off from the battery means (9) to the microprocessor means (2).

5. The apparatus according to claim 4, wherein:

said display means (7; 17, 17') is a video-type display (7).

6. The apparatus according to claim 4, wherein:

said display means (7; 17, 17') includes a first plurality of light-emitting diodes (17) for indicating one type of rosary prayer and a second plurality of light-emitting diodes (17') for indicating a group of rosary prayers.

7. The apparatus according to claim 4, wherein:

said microprocessor means (2) includes a vocal synthesizer.

8. The apparatus according to claim 4, wherein:

said buzzer means (8; 18) emits musical motives accompanying the single steps of the rosary prayer.

9. The apparatus according to claim 5, wherein:

said video-type display (7) is alphanumerical.

10. The apparatus according to claim 5, wherein:

said video-type display (7) is graphical.

11. The apparatus according to claim 9, wherein:

said alphanumerical video-type display (7) is a liquid crystal.

* * * * *